(12) United States Patent
Hahn et al.

(10) Patent No.: US 8,691,896 B2
(45) Date of Patent: *Apr. 8, 2014

(54) HALOGEN-FREE, PHOSPHORUS-CONTAINING FLAME-RETARDANT POLYMER FOAMS

(75) Inventors: Klaus Hahn, Kirchheim (DE); Olaf Kriha, Neustadt (DE); Ingo Bellin, Mannheim (DE); Patrick Spies, Neustadt (DE); Sabine Fuchs, Mannheim (DE); Peter Deglmann, Mannheim (DE); Klemens Massonne, Bad Dürkheim (DE); Hartmut Denecke, Ludwigshafen (DE); Christoph Fleckenstein, Freigericht (DE); Geert Janssens, Friedelsheim (BE); Maximilian Hofmann, Mannheim (DE); Manfred Döring, Wörth (DE); Ciesielski Michael, Merseburg (DE); Jochen Wagner, Mutterstadt (DE)

(73) Assignee: BASF SE, Ludwigshafen (DE)

( * ) Notice: Subject to any disclaimer, the term of this patent is extended or adjusted under 35 U.S.C. 154(b) by 122 days.

This patent is subject to a terminal disclaimer.

(21) Appl. No.: 13/021,843

(22) Filed: Feb. 7, 2011

(65) Prior Publication Data
US 2011/0196053 A1  Aug. 11, 2011

Related U.S. Application Data

(60) Provisional application No. 61/301,720, filed on Feb. 5, 2010.

(51) Int. Cl.
- C08J 9/35  (2006.01)
- C08J 9/06  (2006.01)
- C08K 5/5397  (2006.01)
- C08L 25/06  (2006.01)

(52) U.S. Cl.
USPC .......... 524/135; 252/609; 521/79; 521/88; 521/142; 521/146; 521/907; 524/115; 524/121; 524/129; 524/134; 524/136; 524/137; 524/146; 524/147; 524/148; 524/151

(58) Field of Classification Search
USPC ............ 521/119, 79, 88, 142, 146, 907; 252/609; 524/115, 121, 129, 134–137, 524/146–148, 151
See application file for complete search history.

(56) References Cited

U.S. PATENT DOCUMENTS

| | | | |
|---|---|---|---|
| 3,493,639 A * | 2/1970 | Tavs | 558/125 |
| 3,542,701 A | 11/1970 | van Raamsdonk | |
| 3,812,080 A * | 5/1974 | Feldman | 524/134 |
| 4,440,880 A | 4/1984 | Albanesi et al. | |
| 4,698,215 A | 10/1987 | Albanesi et al. | |
| 5,104,906 A * | 4/1992 | Haas et al. | 521/108 |
| 5,811,470 A * | 9/1998 | Prindle et al. | 521/85 |
| 2006/0074154 A1 * | 4/2006 | Harashina et al. | 524/115 |
| 2008/0153950 A1 * | 6/2008 | Shankar et al. | 524/119 |
| 2012/0264837 A1 | 10/2012 | Eberstaller et al. | |

FOREIGN PATENT DOCUMENTS

| | | | |
|---|---|---|---|
| DE | 1694945 A1 | | 8/1971 |
| EP | 0806451 A1 | | 11/1997 |
| JP | 11180990 A | * | 7/1999 |
| JP | 2004277609 A | * | 10/2004 |
| WO | WO-99/10429 A1 | | 3/1999 |
| WO | WO-2007/058736 A1 | | 5/2007 |
| WO | WO-2011035357 A1 | | 3/2011 |

OTHER PUBLICATIONS

Suh, K; Paquet, A. Rigid Polystyrene Foams and Alternative Blowing Agents. in Modern Styrenic Polymers: Polystyrenes and Styrenic Copolymers. Eds J. Scheirs and D. Priddy. 2003 John Wiley and Sons, Ltd.*
Welsh, G. Polystyrene Packaging Applications: Foam Sheet and Oriented Sheet. . in Modern Styrenic Polymers: Polystyrenes and Styrenic Copolymers. Eds J. Scheirs and D. Priddy. 2003 John Wiley and Sons, Ltd.*
U.S. Appl. No. 13/022,045, filed Feb. 7, 2011, Hahn et. al.
International Search Report for PCT/EP2011/051550, dated Sep. 8, 2011.
International Preliminary Report on Patentability, PCT/EP2011/051550, dated Jul. 2011.

* cited by examiner

*Primary Examiner* — Randy Gulakowski
*Assistant Examiner* — Christina Wales
(74) *Attorney, Agent, or Firm* — Novak Druce Connolly Bove + Quigg LLP

(57) ABSTRACT

Disclosed is a polymer foam with density in the range from 5 to 120 kg/m³ composed of a polymer component including at least one styrene polymer and from 0.1 to 5 parts by weight of a flame retardant mixture including at least one phosphorus compound of the formula $PR^1R^2R^3$. A process for producing the polymer is also disclosed.

20 Claims, No Drawings

HALOGEN-FREE, PHOSPHORUS-CONTAINING FLAME-RETARDANT POLYMER FOAMS

CROSS-REFERENCE TO RELATED APPLICATIONS

This application claims benefit of U.S. Provisional application 61/301,720, filed Feb. 5, 2010 which is incorporated by reference in its entirety.

BACKGROUND OF THE INVENTION

The invention relates to halogen-free, flame-retardant polymer foams based on styrene polymers, to a process for producing halogen-free, flame-retardant polymer foams, and also to the use of these in the construction industry.

Provision of flame retardants to foams is important for a wide variety of applications, examples being molded polystyrene foams made of expandable polystyrene (EPS) and extruded polystyrene foam sheets (XPS) for the insulation of buildings.

The flame retardants currently used in plastics are mainly polyhalogenated hydrocarbons, if appropriate in combination with suitable synergists, for example organic peroxides or nitrogen-containing compounds. A typical representative of these traditional flame retardants is hexabromocyclododecane (HBCD), which is used by way of example in polystyrene. The plastics industry is making great efforts to find replacements for halogenated flame retardants, because of bioaccumulation, and also because some polyhalogenated hydrocarbons are persistent materials.

Flame retardants should ideally exhibit not only a high level of flame-retardant action in the plastic at a low level of loading but also adequate resistance to heat and hydrolysis for processing purposes. They should also exhibit an absence of bioaccumulation and persistency.

DE 1 694 945 describes a process for producing foams, where the foam incorporates sulfur as flame retardant, alone or in combination with brominated phosphorus compounds.

EP 0 806 451 describes flame-retardant styrene polymer compositions which comprise a combination of organic phosphorus compounds and elemental sulfur. The loading required here in order to achieve satisfactory flame retardancy is mostly at least 10 parts by weight of phosphorus compound and sulfur, based on 100 parts by weight of the polymer.

WO 99/10429 likewise describes flame-retardant styrene polymer compositions which comprise a combination of organic phosphorus compounds and elemental sulfur. The total amounts needed here in order to achieve satisfactory flame retardancy are likewise at least 10 parts by weight of phosphorus compound and sulfur, based on 100 parts by weight of polymer.

The flame-retardant polymer compositions described, in the prior art exhibit satisfactory flame-retardant properties. However, the markedly higher amounts of flame retardants used in the prior art for thermoplastic polymers such as polystyrene can disrupt the foaming process for polymer foams, or can have an adverse effect on the mechanical and thermal properties of the foam.

When expandable polystyrene is produced by suspension polymerization, large amounts of flame retardant can moreover reduce the stability of the suspension. Furthermore, the action of flame retardants used in thermoplastic polymers is often not predictable in polymer foams, because of different fire behavior and different fire tests.

There is therefore major scope for improvement in the foamability of polymer compositions of this type. There is moreover a need for improvement in respect of the flame retardancy and the mechanical properties of halogen-free, flame-retardant polymer compositions and polymer foams.

BRIEF SUMMARY OF THE INVENTION

It is therefore an object of the invention to provide halogen-free, flame-retardant polymer compositions that are easy to foam when melted. Another object of the present invention is to provide halogen-free, flame-retardant polymer foams with improved flame retardancy and improved mechanical properties. Another object of the invention is to provide flame-retardant polymer foams with minimum content of flame retardant.

It has been found that certain foams based on styrene polymers which have low density can be rendered flame-retardant by using just very small amounts of a synergistic mixture made of one or more phosphorus compounds and of elemental sulfur.

The invention therefore provides a polymer foam with density in the range from 5 to 120 kg/m$^3$, comprising a) a polymer component, comprising at least one styrene polymer,
b) from 0.1 to 5 parts by weight (based on 100 parts by weight of component a)) of a flame retardant mixture, comprising
   b1) at least one phosphorus compound of the formula (I) having phosphorus content in the range from 5 to 80% by weight, based on the phosphorus compound, $$(X^1)_s=PR^1R^2R^3 \qquad (I)$$

where the definitions of the symbols and indices in the formula (I) are as follows:

$R^1$ is $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$;

$R^2$ is $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy, $SR^9$, $COR^{16}$, $COOR^{11}$, $CONR^{12}R^{13}$;

$R^3$ is H, SH, $SR^4$, OH, $OR^5$, or a
$-(Y^1)_n-[P(=X^2)_uR^6-(Y^2)_n]_m-P(=X^3)_tR^7R^8$ group;
or two groups $R^1$, $R^2$, $R^3$ form, together with the phosphorus atom bonded thereto, a ring system;

$X^1$, $X^2$ and $X^3$ are identical or different and, independently of one another, O or S;

$Y^1$ and $Y^2$ are identical or different, being O or S;

$R^4$, $R^5$, $R^9$, $R^{10}$, $R^{11}$, $R^{12}$, and $R^{13}$ are identical or different, being $C_1$-$C_{12}$-alkyl, $C_3$-$C_8$-cycloalkyl, which may either have no substitution or may have one or more $C_1$-$C_4$-alkyl groups as substituents, or being $C_2$-$C_{12}$-alkenyl, $C_2$-$C_{12}$-alkynyl, $C_6$-$C_{10}$-aryl, or $C_6$-$C_{10}$-aryl-$C_1$-$C_4$-alkyl;

$R^6$, $R^7$, and $R^8$ are identical or different and, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$;

n is 0 or 1 if $Y^1$ and, respectively, $Y^2$ is O, and is 1, 2, 3, 4, 5, 6, 7, or 8 if $Y^1$ and, respectively, $Y^2$ is S;

m is an integer from 0 to 100;

s, t, and u are, independently of one another, 0 or 1; and
   b2) elemental sulfur.

The invention further provides processes for producing halogen-free, flame-retardant polymer foams, where from 0.1 to 5 parts by weight of the flame retardant mixture b) (based on 100 parts by weight of the polymer component) are added to the respective polymer composition. The invention equally provides the use of the polymer foam of the invention as insulating material, particularly in the construction industry.

DETAILED DESCRIPTION OF THE INVENTION

The definitions of the symbols and indices in the formula (I) are preferably as follows:

$R^1$ is preferably $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy.

$R^2$ is preferably $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy.

$R^3$ is preferably H, SH, $SR^4$, OH, $OR^5$, or a
—$(Y^1)_n$—$[P(=X^2)_u R^6$—$(Y^2)_n]_m$—$P(=X^3)_t R^7 R^8$ group.

$X^1$, $X^2$ and $X^3$ are preferably identical or different and, independently of one another, O or S.

$Y^1$ and $Y^2$ are preferably identical or different, being O or S.

$R^4$ and $R^5$ are preferably identical or different, being $C_1$-$C_{12}$-alkyl, $C_3$-$C_8$-cycloalkyl, which may either have no substitution or may have one or more $C_1$-$C_4$-alkyl groups as substituents, or being $C_2$-$C_{12}$-alkenyl, $C_2$-$C_{12}$-alkynyl, $C_6$-$C_{10}$-aryl, or $C_6$-$C_{10}$-aryl-$C_1$-$C_4$-alkyl.

$R^6$, $R^7$, and $R^8$ are preferably identical or different, independently of one another, $C_1$-$C_{16}$-alkyl, $C_1$-$C_{16}$-alkenyl, $C_1$-$C_{16}$-alkoxy, $C_1$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$.

n is preferably 1 if $Y^1$ and, respectively, $Y^2$ is O, and is 1 or 2 if $Y^2$ is S.

m is preferably an integer from 0 to 10.

s, t, and u are preferably 1.

Preference is given to compounds of the formula (I) in which the definitions of all of the symbols and indices are the preferred definitions.

Preference is given to compounds of the formula (I) in which two moieties $R^1$, $R^2$, $R^3$ do not together form a ring system.

Preference is also given to compounds of the formula (I) in which the definitions of the symbols and indices in the formula (I) are as follows:

$R^1$ is $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy;

$R^2$ is $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy;

$R^3$ is H, SH, $SR^4$, OH, $OR^5$, or a
—$(Y^1)_n$—$[P(=X^2)_u R^6$—$(Y^2)_n]_m$—$P(=X^3)_t R^7 R^8$ group;

$X^1$, $X^2$ and $X^3$ are identical or different and, independently of one another, O or S;

$Y^1$ and $Y^2$ are identical or different, being O or S;

$R^4$ and $R^6$ are identical or different, being $C_3$-$C_{12}$-alkyl, $C_3$-$C_8$-cycloalkyl, which may either have no substituents or may have one or more $C_1$-$C_4$-alkyl groups as substituents, or being $C_2$-$C_{12}$-alkenyl, $C_2$-$C_{12}$-alkynyl, or $C_6$-$C_{10}$-aryl-$C_1$-$C_4$-alkyl;

$R^6$, $R^7$, and $R^8$ are identical or different and, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_5$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$;

n is 1 if $Y^1$ and, respectively, $Y^2$ is O, and is 1 or 2 if $Y^2$ is S;

m is 0 or 1, and s, t, and u are 1.

Preference is also given to compounds of the formula (I) in which the definitions of the symbols and indices in the formula (I) are as follows:

$R^1$ is $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy;

$R^2$ is $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy;

$R^3$ is H, SH, $SR^4$, OH, $OR^5$, or a
—$(Y^1)_n$—$[P(=X^2)_u R^6$—$(Y^2)_n]_m$—$P(=X^3)_t R^7 R^8$ group;

$X^1$, $X^2$ and $X^3$ are identical or different and, independently of one another, O or S;

$Y^1$ and $Y^2$ are identical or different, being O or S;

$R^4$ and $R^5$ are identical or different, being $C_3$-$C_8$-cycloalkyl, which may either have no substitution or may have one or more $C_1$-$C_4$-alkyl groups as substituents, or being $C_2$-$C_{12}$-alkenyl or $C_2$-$C_{12}$-alkynyl, $R^6$, $R^7$, and $R^8$ are identical or different and, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$;

n is 1 if $Y^1$ and, respectively, $Y^2$ is O, and is 1 or 2 if $Y^2$ is S;

m is 0 or 1, and s, t, and u are 1.

Preference is also given to compounds of the formula (I) in which the definitions of the symbols and indices in the formula (I) are as follows:

$R^1$ is $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy;

$R^2$ is $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy;

$R^3$ is a —$(Y^1)_n$—$[P(=X^2)_u R^6$—$(Y^2)_n]_m$—$P(=X^3)_t R^7 R^8$ group;

$X^1$, $X^2$ and $X^3$ are identical or different and, independently of one another, O or S;

$Y^1$ and $Y^2$ are identical or different, being O or S;

$R^6$, $R^7$, and $R^8$ are identical or different and, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$;

n is 1 if $Y^1$ and, respectively, $Y^2$ is O, and is 1 or 2 if $Y^2$ is S;

m is 0 or 1, and s, t, and u are 1.

In other preferred embodiments, the synergistic flame retardant combination b) of the invention comprises no trimethyl phosphate and/or no tetramethylphosphine disulfide.

It is particularly preferable that the definitions of the symbols and indices in the formula (I) are as follows:
- $R^1$ is particularly preferably $C_1$-$C_6$-alkyl, $C_1$-$C_8$-alkoxy, cyclohexyl, phenyl, phenoxy, benzyl, benzyloxy.
- $R^2$ is particularly preferably $C_1$-$C_8$-alkyl, $C_1$-$C_8$-alkoxy, cyclohexyl, phenyl, benzyl, benzyloxy.
- $R^3$ is particularly preferably H, SH, $SR^4$, OH, $OR^5$ or a $-(Y^1)_n-P(=X^3)_rR^7R^8$ group.
- $X^1$ and $X^3$ are particularly preferably identical or different, being O or S.
- $Y^1$ is particularly preferably O or S.
- $R^4$ and $R^5$ are identical or different, being $C_1$-$C_8$-alkyl, cyclohexyl, phenyl, or benzyl.
- $R^7$ and $R^8$ are particularly preferably identical or different, being $C_1$-$C_8$-alkyl, $C_1$-$C_8$-alkoxy, cyclohexyl, phenyl, phenoxy, benzyl, or benzyloxy.
- n is particularly preferably 1 if $Y^1$ is O, and is particularly preferably 1 or 2 if $Y^1$ is S.
- s and t are particularly preferably 1.

Particular preference is given to compounds of the formula (I) in which the definitions of the symbols and indices are the particularly preferred definitions.

Particular preference is further given to compounds of the formula (I) in which the definitions of the symbols and indices in the formula (I) are as follows:
- $R^1$ is particularly preferably $C_1$-$C_8$-alkyl, $C_1$-$C_8$-alkoxy, cyclohexyl, phenyl, phenoxy, benzyl, benzyloxy;
- $R^2$ is particularly preferably $C_1$-$C_8$-alkyl, $C_1$-$C_8$-alkoxy, cyclohexyl, phenyl, benzyl, benzyloxy;
- $R^3$ is particularly preferably H, SH, $SR^4$, OH, $OR^5$ or a $-(Y^1)_n-P(=X^3)_rR^7R^8$ group;
- $X^1$ and $X^3$ are particularly preferably identical or different, being O or S;
- $Y^1$ is particularly preferably O or S;
- $R^4$ and $R^5$ are particularly preferably identical or different, being $C_3$-$C_8$-alkyl, cyclohexyl, or benzyl;
- $R^7$ and $R^8$ are particularly preferably identical or different, being $C_1$-$C_8$-alkyl, $C_1$-$C_8$-alkoxy, cyclohexyl, phenyl, phenoxy, benzyl, or benzyloxy;
- n is particularly preferably 1 if $Y^1$ is O, and is particularly preferably 1 or 2 if $Y^1$ is S, and
- s and t are particularly preferably 1.

Particular preference is further given to compounds of the formula (I) in which the definitions of the symbols and indices in the formula (I) are as follows:
- $R^1$ is particularly preferably $C_1$-$C_8$-alkyl, $C_1$-$C_8$-alkoxy, cyclohexyl, phenyl, phenoxy, benzyl, benzyloxy;
- $R^2$ is particularly preferably $C_1$-$C_8$-alkyl, $C_1$-$C_8$-alkoxy, cyclohexyl, phenyl, benzyl, benzyloxy;
- $R^3$ is particularly preferably H, SH, $SR^4$, OH, $OR^5$ or a $-(Y^1)_n-P(=X^3)_rR^7R^8$ group;
- $X^1$ and $X^3$ are particularly preferably identical or different, being O or S;
- $Y^1$ is particularly preferably O or S;
- $R^4$ and $R^5$ are particularly preferably cyclohexyl;
- $R^7$ and $R^8$ are particularly preferably identical or different, being $C_1$-$C_8$-alkyl, $C_1$-$C_8$-alkoxy, cyclohexyl, phenyl, phenoxy, benzyl, or benzyloxy;
- n is particularly preferably 1 if $Y^1$ is O, and is particularly preferably 1 or 2 if $Y^1$ is S, and
- s and t are particularly preferably 1.

Particular preference is further given to compounds of the formula (I) in which the definitions of the symbols and indices in the formula (I) are as follows:
- $R^1$ is particularly preferably $C_1$-$C_8$-alkyl, $C_1$-$C_8$-alkoxy, cyclohexyl, phenyl, phenoxy, benzyl, benzyloxy;
- $R^2$ is particularly preferably $C_1$-$C_8$-alkyl, $C_1$-$C_8$-alkoxy, cyclohexyl, phenyl, benzyl, benzyloxy;
- $R^3$ is particularly preferably a $-(Y^1)_n-P(=X^3)_rR^7R^8$ group;
- $X^1$ and $X^3$ are particularly preferably identical or different, being O or S;
- $Y^1$ is particularly preferably O or S;
- $R^7$ and $R^8$ are particularly preferably identical or different, being $C_1$-$C_8$-alkyl, $C_1$-$C_8$-alkoxy, cyclohexyl, phenyl, phenoxy, benzyl, or benzyloxy;
- n is particularly preferably 1 if $Y^1$ is O, and is particularly preferably 1 or 2 if $Y^1$ is S, and
- s and t are particularly preferably 1.

It is particularly preferable that the definitions of the symbols and indices in the formula (I) are as follows:
- $R^1$ is with particular preference phenyl, phenyloxy.
- $R^2$ is with particular preference phenyl.
- $R^3$ is with particular preference H, SH, $SR^4$, OH, $OR^5$, or a $-(Y^1)_n-P(=X^3)_rR^7R^8$ group.
- $X^1$ and $X^3$ are with particular preference identical or different, being O or S.
- $Y^1$ is with particular preference O or S.
- $R^4$ and $R^5$ are with particular preference identical or different, being cyclohexyl, phenyl, or benzyl.
- $R^7$ and $R^8$ are with particular preference identical or different, being phenyl, phenoxy;
- n is with particular preference 1 if $Y^1$ is O, and is with particular preference 1 or 2 if $Y^1$ is S.
- s and t are with particular preference 1.

Preference is in particular given to compounds of the formula (I) in which the definitions of the symbols and indices are the definitions that are particularly preferred.

Further preference is in particular given to those compounds of the formula (I) in which the definitions of the symbols and indices in the formula (I) are as follows:
- $R^1$ is with particular preference phenyl, phenoxy;
- $R^2$ is with particular preference phenyl;
- $R^3$ is with particular preference H, SH, $SR^4$, OH, $OR^5$, or a $-(Y^1)_n-P(=X^3)_rR^7R^8$ group;
- $X^1$ and $X^3$ are with particular preference identical or different, being O or S;
- $Y^1$ is with particular preference O or S;
- $R^4$ and $R^8$ are with particular preference identical or different, being benzyl;
- $R^7$ and $R^8$ are with particular preference identical or different, being phenyl, phenoxy;
- n is with particular preference 1 if $Y^1$ is O, and is with particular preference 1 or 2 if $Y^1$ is S, and
- s and t are with particular preference 1.

Further preference is in particular given to those compounds of the formula (I) in which the definitions of the symbols and indices in the formula (I) are as follows:
- $R^1$ and $R^2$ are with particular preference phenyl, phenoxy;
- $R^3$ is with particular preference a $-(Y^1)_n-P(=X^3)_rR^7R^8$ group;
- $X^1$ and $X^3$ are with particular preference identical or different, being O or S;
- $Y^1$ is with particular preference O or S;
- $R^7$ and $R^8$ are with particular preference identical or different, being phenyl, phenoxy;
- n is with particular preference 1 if $Y^1$ is O, and is with particular preference 1 or 2 if $Y^1$ is S, and
- s and t are with particular preference 1.

Preference is further given to the following groups of compounds of the formula (I):

$S=PR^1R^2-H$ (Ia)

$S=PR^1R^2-SH$ (Ib)

$S=PR^1R^2-OH$ (Ic)

$S=PR^1R^2-S\text{-phenyl}$ (Id)

$S=PR^1R^2-O\text{-phenyl}$ (Ie)

$S=PR^1R^2-S\text{-benzyl}$ (If)

$S=PR^1R^2-O\text{-benzyl}$ (Ig)

$S=PR^1R^2-P(=S)R^7R^8$ (Ih)

$S=PR^1R^2-S-P(=S)R^7R^8$ (Ii)

$S=PR^1R^2-S-S-P(=S)R^7R^8$ (Ij)

$S=PR^1R^2-O-P(=S)R^7R^8$ (Ik)

$O=PR^1R^2-H$ (Il)

$O=PR^1R^2-SH$ (Im)

$O=PR^1R^2-OH$ (In)

$O=PR^1R^2-S\text{-phenyl}$ (Io)

$O=PR^1R^2-O\text{-phenyl}$ (Ip)

$O=PR^1R^2-S\text{-benzyl}$ (Iq)

$O=PR^1R^2-P(=S)R^7R^8$ (Ir)

$O=PR^1R^2-S-P(=S)R^7R^8$ (Is)

$O=PR^1R^2-S-S-P(=S)R^7R^8$ (It)

$O=PR^1R^2-O-P(=S)R^7R^8$ (Iu)

$O=PR^1R^2-P(=O)R^7R^8$ (Iv)

$O=PR^1R^2-S-P(=O)R^7R^8$ (Iw)

$O=PR^1R^2-S-S-P(=O)R^7R^8$ (Ix)

$O=PR^1R^2-O-P(=O)R^7R^8$ (Iy), where the definitions of the symbols are as stated in the formula (I).

Preference is also given to compounds of the formula (I) in which $R^1$ and $R^2$ are identical.

Preference is also given to compounds of the formula (I) in which $R^7$ and $R^8$ are identical.

Particular preference is given to compounds of the formula (I) in which $R^1$, $R^2$, $R^7$, and $R^8$ are identical.

Compounds of the formula (I) to which particular preference is given are the compounds FSM 1 to FSM 6 listed in the examples.

It is preferable to use 1 compound of the formula (I) as flame retardant.

Preference is further given to a mixture of two or more, particularly preferably from two to four, in particular two, compounds of the formula (I) as flame retardant.

Some of the compounds of the formula (I) are commercially available, examples being FSM1 from ABCR GmbH & Co KG, Karlsruhe, Germany, FSM4 in the form of Disflamoll Temperatur from Lanxess, FSM6 in the form of HCA from Sanko, and FSM7 in the form of Cyagard RF-1241 from Cytech.

Flame retardants FMS 2, 3, and 4 can by way of example be produced in accordance with the following references:

FSM2: J. I. G. Cadogan; J. B, Husband; H. McNab; J. Chem. Soc. Perkin Trans. I.; 1983; 1489 to 1495.

FSM3: M. G. Zimin, N. G. Zabirov; V. Smirnov; Zhournal Obschei Khimii; 1980; 50; 1; 24 to 30.

FSM4: W. Kuchen, H. Buchwald, Chem. Ber. 1958, 91, 2871 to 2877.

Another preferred phosphorus compound (as component b1)) is bis(hydroxy-methyl)isobutylphospine oxide (FSM6).

The ratio by weight of component b1) (phosphorus compound) to component b2) (sulfur) is generally from 1:0.1 to 1:10, preferably from 1:0.2 to 1:7, particularly preferably from 1:0.3 to 1:5, and in particular from 1:0.3 to 1:3.

For the purposes of the invention, the parts by weight data for component b) and also for components b1) and b2) are always based on 100 parts by weight of polymer (component a)).

The polymer foam generally comprises amounts of from 0.1 to 5.0 parts by weight, preferably from 0.5 to 4.5 parts by weight, particularly preferably from 1.0 to 4.0 parts by weight, in particular from 2.5 to 4.0 parts by weight, of the synergistic flame retardant mixture, based on 100 parts by weight of component a).

The polymer composition generally comprises, as component b2), from 0.1 to 5 parts by weight, preferably from 0.2 to 3 parts by weight, with particular preference from 0.3 to 2.5 parts by weight, of elemental sulfur. The distribution of the elemental sulfur in the polymer foam is preferably substantially homogeneous, and this can be achieved by way of example via admixture during the extrusion process or via static or dynamic mixers (e.g. kneaders).

The form in which the elemental sulfur is used can also be that of starting compounds which are decomposed to elemental sulfur under the conditions of the process.

Another possibility is use of elemental sulfur in encapsulated form. Examples of encapsulating materials are melamine resins (by analogy with U.S. Pat. No. 4,440,880) and urea-formaldehyde resins (by analogy with U.S. Pat. No. 4,698,215). Further materials and references are found in WO 99/10429.

The polymer foam of the invention can, if appropriate, comprise further suitable flame retardant synergists, examples being the thermal free-radical generators dicumyl peroxide, di-tert-butyl peroxide, or biscumyl (2,3-diphenyl-2,3-dimethylbutane). In this case the foam usually comprises, in addition to the phosphorus compound(s) b1), from 0.05 to 5 parts by weight of the flame retardant synergist, based on 100 parts by weight of component a).

The polymer composition can also comprise further flame retardants, such as melamine, melamine cyanurates, metal oxides, metal hydroxides, phosphates, phosphonates, phosphinates, or expandable graphite, or synergists, such as $Sb_2O_3$, Sn compounds, or compounds that comprise or liberate nitroxyl radicals. Suitable additional halogen-free flame retardants are obtainable by way of example commercially as Exolit OP 930, Exolit OP 1312, HCA-HQ, M-Ester, Cyagard RF-1243, Fyrol PMP, Phoslite IP-A (aluminium hypophosphite), Melapur 200, Melapur MC, APP (ammonium polyphosphate), and Budit 833.

If complete freedom from halogen is not necessary, reduced-halogen-content polymer compositions can be produced by using the compounds (I) of the invention and adding relatively small amounts of halogen-containing, in particular brominated, flame retardants, e.g. hexabromocyclododecane (HBCD), or brominated styrene homo- or copolymers/oligomers (e.g. styrene-butadiene copolymers as described in WO-A 2007/058736), the amounts here preferably being in the range from 0.05 to 1 parts by weight, in particular from 0.1 to 0.5 parts by weight of (based on 100 parts by weight of component a)).

In one preferred embodiment, the flame retardant mixture of the invention is halogen-free. It is particularly preferable that the composition made of polymer, flame retardant mixture, and further additives is halogen-free.

The density of the polymer foam of the invention is generally in the range from 5 to 120 kg/m$^3$, preferably from 8 to 60 kg/m$^3$, particularly preferably from 10 to 35 kg/m$^3$.

Polymer component a) comprises at least one styrene polymer.

In the invention, the expression styrene polymer comprises polymers based on styrene, alpha-methylstyrene, or a mixture of styrene and alpha-methylstyrene; by analogy, this applies to the styrene content in SAN, AMSAN, ABS, ASA, MBS, and MABS (see below). Styrene polymers of the invention are based on at least 50 parts by weight of styrene and/or alpha-methylstyrene monomers.

Styrene polymers preferably used comprise glassclear polystyrene (GPPS), impact-resistant polystyrene (HIPS), anionically polymerized polystyrene or impact-resistant polystyrene (AIPS), styrene-alpha-methylstyrene copolymers, acrylonitrile-butadiene-styrene polymers (ABS), styrene-acrylonitrile copolymers (SAN), acrylonitrile-alpha-methylstyrene copolymers (AMSAN), acrylonitrile-styrene-acrylate (ASA), methyl acrylate-butadien-styrene (MBS), or methyl methacrylate-acrylonitrile-butadiene-styrene (MASS) polymers, or a mixture of these or with polyphenylene ether (PPE).

In order to improve mechanical properties or resistance to temperature change, the styrene polymers mentioned can be admixed thermoplastic polymers, such as polyamides (PA), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones or polyether sulfides (PES), or a mixture thereof, generally in total proportions of at most 30 parts by weight, preferably in the range from 1 to 10 parts by weight, based on 100 parts by weight of polymer melt, with use of compatibilizers, if appropriate. It is also possible to produce mixtures in the ranges of amounts mentioned with, for example, hydrophobically modified or functionalized polymers or oligomers, or rubbers, such as polyacrylates or polydienes, e.g. with styrene-butadiene block copolymers or with biodegradable aliphatic or aliphatic/aromatic copolyesters.

Examples of suitable compatibilizers are maleic anhydride-modified styrene copolymers, polymers containing epoxy groups, or organosilanes.

Particular preference is given to foams of the invention comprising, preferably composed of, polystyrene, in particular extruded polystyrene foams (XPS) and foams obtained from expandable polystyrene (EPS).

The molar mass M$_w$ of expandable styrene polymers (EPS) is preferably in the range from 120 000 to 400 000 g/mol, particularly preferably in the range from 180 000 to 300 000 g/mol, measured by means of gel permeation chromatography to DIN 55672-1 using refractiometric detection (RI) against polystyrene standards. Because of degradation of molar mass during shear and/or exposure to heat, the molar mass of the expandable polystyrene is generally below the molar mass of the polystyrene used by about 10 000 g/mol.

The invention also provides a process for producing the polymer foam of the invention, where the flame retardant mixture (component b)) is added to polymer component a) and the mixture is foamed to give a polymer foam.

For the purposes of the invention, the expression "added to the polymer" (addition) here comprises all of the methods known within the prior art.

The addition can therefore take place via addition of the synergistic flame retardant mixture (component b))
i) to the finished polymer, or
ii) via addition during production of the polymer.

In an example of the method used for production as in ii), the polymerization process uses bulk polymerization, solution polymerization, or emulsion polymerization, suspension polymerization, or dispersion polymerization, in the presence of component b), i.e. addition to the monomers prior to, during, or after the polymerization process. The suspension polymerization process is preferred.

In the suspension polymerization process it is preferable that styrene is the sole monomer used. However, up to 20% of the weight of styrene can have been replaced by other ethylenically unsaturated monomers, e.g. alkylstyrenes, divinylbenzene, acrylonitrile, 1,1-diphenyl ether, or alpha-methylstyrene. Preference is also given to the monomers from which the preferred polymers are obtainable.

It is preferable that the polymer composition of the invention is produced via addition to the finished polymer i).

For this, in one preferred embodiment, a polymer melt is produced and component b) is incorporated by mixing prior to, during, or after production of the melt.

The polymer melt can also receive admixtures of polymer recyclates of the abovementioned thermoplastic polymers, in particular styrene polymers and expandable styrene polymers (EPS), in amounts which do not substantially impair their properties, the amounts generally being at most 50 parts by weight, in particular from 1 to 20 parts by weight, based on 100 parts by weight of polymer component a).

Other materials that can be added to the polymer melt are additives, nucleating agents, fillers, plasticizers, soluble and insoluble inorganic and/or organic dyes and pigments, e.g. IR absorbers, such as carbon black, graphite, or aluminum powder, together or with spatial separation, e.g. by way of mixers or ancillary extruders. The amounts generally added of the dyes and pigments are in the range from 0.01 to 30 parts by weight, preferably in the range from 1 to 5 parts by weight, based on 100 parts by weight of component a). In order to achieve homogeneous and microdisperse distribution of the pigments within the styrene polymer it can be advantageous, particularly in the case of polar pigments, to use a dispersing agent, e.g. organosilanes, polymers containing epoxy groups, or maleic anhydride-grafted styrene polymers. Preferred plasticizers are mineral oils and phthalates, and the amounts that can be used of these are from 0.05 to 10 parts by weight, based on 100 parts by weight of component a). Analogously, these compounds can be also added before, during and/or after suspension polymerization to EPS according to the invention.

The density of the halogen-free, flame-retardant polymer foams is preferably in the range from 8 to 60 kg/m$^s$, particularly preferably in the range from 10 to 35 kg/m$^3$, and their proportion of closed cells is preferably more than 80%, particularly preferably from 90 to 100%.

Extruded styrene polymer foams (XPS) and foams of the invention made of expandable styrene polymers (EPS foams) can be processed to give foam sheets (XPS) or foam strands via mixing to incorporate a blowing agent and the flame retardant of the invention into the polymer melt, extrusion, and pelletization under pressure to give expandable pellets (EPS), and subsequent expansion of the pellets to give the EPS foam, or via extrusion and depressurization of the polymer melt with use of appropriately shaped dies.

In one preferred embodiment, the foam is an EPS foam.

In another preferred embodiment, the foam is an extruded styrene polymer foam (XPS).

The polymer melt comprising blowing agent generally comprises, based on 100 parts by weight of the polymer melt, a total proportion of from 2 to 10 parts by weight, preferably from 3 to 7 parts by weight, of one or more blowing agents homogeneously distributed. Suitable blowing agents are the physical blowing agents usually used in EPS, for example aliphatic hydrocarbons having from 2 to 7 carbon atoms, alcohols, ketones, ethers, or halogenated hydrocarbons. It is preferable to use isobutane, n-butane, isopentane, or n-pentane. For XPS, it is preferable to use $CO_2$ or a mixture thereof with alcohols and/or with $C_2$-$C_4$ carbonyl compounds, in particular ketones.

In order to improve foamability, it is possible to introduce finely distributed internal water droplets into the polymer matrix. This can be achieved for example via addition of water to the molten polymer matrix. Addition of the water can take place at a location upstream of, identical with, or downstream of the location of blowing agent feed. Homogeneous distribution of the water can be achieved by means of dynamic or static mixers. A sufficient amount of water is generally from 0 to 2 parts by weight, preferably from 0.05 to 1.5 parts by weight, based on 100 parts by weight of component a).

Foaming of expandable styrene polymers (EPS) having at least 90% of the internal water in the form of internal water droplets with a diameter in the range from 0.5 to 15 µm gives foams with an adequate cell number and with homogeneous foam structure.

The amount of blowing agent and water added is selected in such a way that the expansion capability α of the expandable styrene polymers (EPS), defined as bulk density prior to foaming/bulk density after foaming is at most 125, preferably from 15 to 100.

The bulk density of the expandable styrene polymer pellets (EPS) of the invention is generally at most 700 g/l, preferably in the range from 590 to 660 g/l. When fillers are used, bulk densities in the range from 590 to 1200 g/l can occur as a function of the nature and amount of the filler.

Components b1) and b2) are added prior to, during, or after production of the melt.

Further additives and auxiliaries can also be added. Preference is given here to any additives and auxiliaries that are comprised in the polymer composition.

To produce the halogen-free, flame-retardant polymer foam of the invention according to the granulation process, the blowing agent can be incorporated by mixing into the polymer melt. One possible process comprises the stages of a) melt production, b) mixing, c) cooling, d) conveying, e) pelletization, and f) expansion. Each of the stages a) to e) can be executed via the apparatuses or apparatus combinations known in plastics processing. For the incorporation process by mixing, static or dynamic mixers are suitable, for example extruders. The polymer melt can be taken directly from a polymerization reactor or produced via melting of polymer pellets, directly in the mixing extruder or in a separate melting extruder. The cooling of the melt can take place in the mixing assemblies or in separate coolers. Examples of pelletization processes that can be used are pressurized underwater pelletization, pelletization using rotating knives, and cooling via spray-misting of coolant liquids, and pelletization with atomization. Examples of suitable apparatus arrangements for conducting the process are:

a) polymerization reactor-static mixer/cooler-pelletizer
b) polymerization reactor-extruder-pelletizer
c) extruder-static mixer-pelletizer
d) extruder-pelletizer.

The arrangement may also have ancillary extruders for introducing additives, e.g. solids or heat-sensitive additives.

The temperature of the polymer melt comprising blowing agent when it is passed through the die plate is generally in the range from 140 to 300° C., preferably in the range from 160 to 240° C. Cooling to the region of the glass transition temperature is not necessary.

The die plate is heated at least to the temperature of the polymer melt comprising blowing agent. The temperature of the die plate is preferably above the temperature of the polymer melt comprising blowing agent, by from 20 to 100° C., in order to avoid polymer deposits in the dies, and to ensure problem-free pelletization.

In order to obtain marketable pellet sizes, the diameter (D) of the holes in the die at the outlet of the die should be in the range from 0.2 to 1.5 mm, preferably in the range from 0.3 to 1.2 mm, particularly preferably in the range from 0.3 to 0.8 mm. This permits targeted adjustment to pellet sizes below 2 mm, in particular in the range from 0.4 to 1.4 mm, even after die swell.

Particular preference is given to a process comprising the following steps for producing a halogen-free flame-retardant EPS foam:

a) mixing to incorporate an organic blowing agent and, preferably, from 1-25 parts by weight of the flame retardant of the invention (based on 100 parts by weight of component a)) into the polymer melt by means of static or dynamic mixers at a temperature of at least 150° C.,
b) cooling of the blowing agent-containing polymer melt, to a temperature of at least 120° C.,
c) discharge via a die plate with holes, the diameter of which at the die outlet is at most 1.5 mm,
d) pelletizing of the melt comprising blowing agent, directly downstream of the die plate, under water, at a pressure in the range from 1 to 20 bar, and
e) foaming of the resultant pellets to give an EPS foam.

It is also preferred to produce the expandable styrene polymers (EPS) of the invention via suspension polymerization in aqueous suspension in the presence of the flame retardant of the invention and of an organic blowing agent.

In the case of the suspension polymerization process, it is preferable that styrene is the sole monomer used. However, up to 20% of the weight of styrene can have been replaced by other ethylenically unsaturated monomers, such as alkylstyrenes, divinylbenzene, acrylonitrile, 1,1-diphenyl ether, or alpha-methylstyrene.

The usual auxiliaries can be added during the suspension polymerization process, examples being peroxide initiators, suspension stabilizers, blowing agents, chain-transfer agents, expansion aids, nucleating agents, and plasticizers. The amounts of flame retardant of the invention added in the polymerization process are from 0.5 to 25 parts by weight, preferably from 5 to 15 parts by weight. The amounts of blowing agents added are from 2 to 10 parts by weight, based on monomer. These amounts can be added prior to, during, or after polymerization of the suspension. Examples of suitable blowing agents are aliphatic hydrocarbons having from 4 to 6 carbon atoms. It is advantageous to use inorganic Pickering dispersants as suspension stabilizers, an example being magnesium pyrophosphate or calcium phosphate.

The suspension polymerization process produces bead-shaped particles which are in essence round, with average diameter in the range from 0.2 to 2 mm.

In order to improve processability, the finished expandable styrene polymer pellets can be coated with glycerol ester, antistatic agent, or anticaking agent.

The EPS pellets can be coated with glycerol monostearate GMS (typically 0.25%), glycerol tristearate (typically 0.25%), Aerosil R972 fine-particle silica (typically 0.12%), or Zn stearate (typically 0.15%), or else antistatic agent.

The invention also provides expandable styrene polymer pellets which have been manufactured in such a way (for example by virtue of the amount of blowing agent that they comprise) that an EPS foam of the invention can be obtained therefrom.

The time at which step (e) of the process of the invention is conducted is usually different from that at which steps (a)-(d) are conducted, step (e) being conducted by way of example at the premises of a user.

The expandable styrene polymer pellets of the invention can be prefoamed in a first step by means of hot air or steam in what are known as prefoamers to give foam beads of density in the range from 5 to 120 kg/m$^3$, in particular from 8 to 60 kg/m$^3$, and in a second step they can be fused within a closed mold to give molded foams. For this, the prefoamed beads are introduced into molds which do not have a gas-tight seal and are treated with steam. The moldings can be removed after cooling.

In another preferred embodiment, the polymer foam is an extruded polystyrene (XPS), obtainable via:
(a) heating of a polymer to form a polymer melt,
(b) introducing a blowing agent component T into the polymer melt to form a foamable melt,
(c) extruding the foamable melt into a region of relatively low pressure with foaming, to give an extruded foam, and
(d) adding the flame retardant mixture of the invention and also, if appropriate, further auxiliaries and additional materials, in at least one of steps a) and/or b).

Foams of the invention based on styrene polymers, in particular EPS and XPS, are suitable by way of example for use as insulating materials, in particular in the construction industry. Preference is given to a use as halogen-free insulating material, in particular in the construction industry.

The extinguishment time of foams of the invention based on styrene polymers, such as EPS and XPS (DIN 4102 fire test B2 with foam density 15 g/l and aging time 72 h) is preferably ≤15 sec, particularly preferably ≤10 sec, and the foams therefore comply with the conditions for passing the abovementioned fire test, as long as flame height does not exceed the limit stated in the standard.

The examples below provide further explanation of the invention, without any resultant restrictions.

Flame retardants used (FSM) 1 to 6:

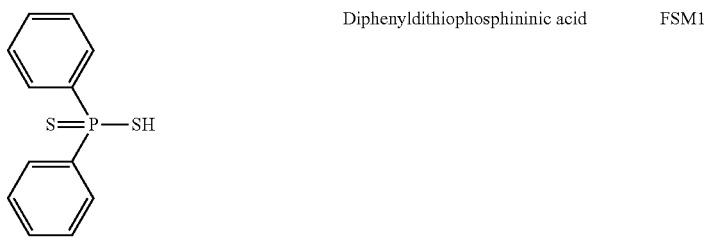

Diphenyldithiophosphininic acid    FSM1

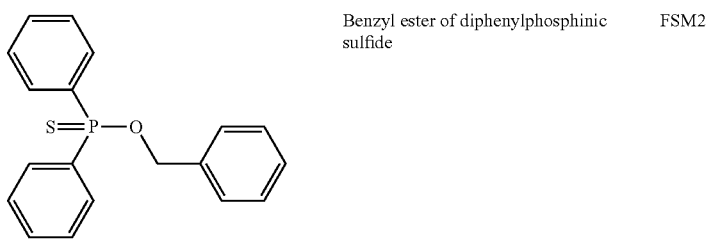

Benzyl ester of diphenylphosphinic sulfide    FSM2

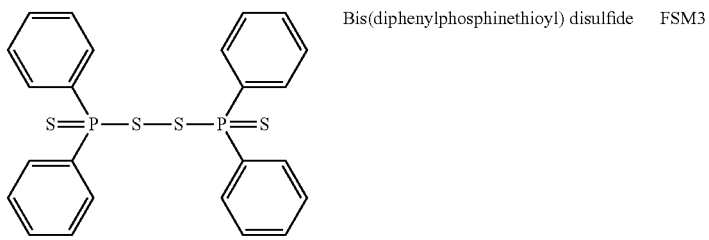

Bis(diphenylphosphinethioyl) disulfide    FSM3

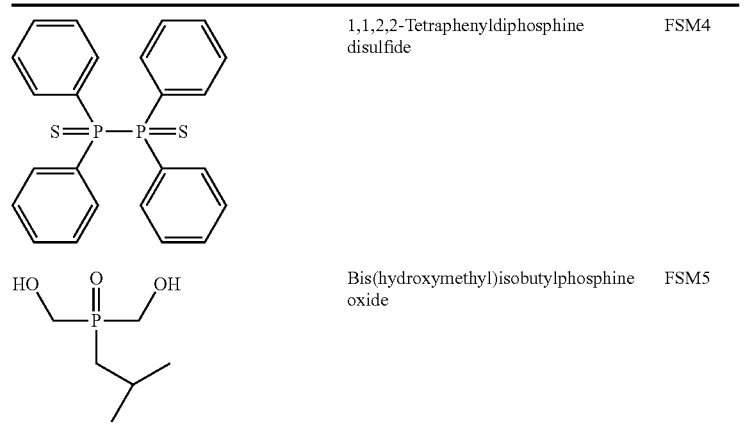

| | 1,1,2,2-Tetraphenyldiphosphine disulfide | FSM4 |
| | Bis(hydroxymethyl)isobutylphosphine oxide | FSM5 |

DESCRIPTION OF EXPERIMENTS

The fire behavior of the foam sheets was determined with foam density 15 kg/m³ to DIN 4102.

Hexabromocyclododecane (hereinafter termed HBCD) was used in a comparative experiment.

Expandable Styrene Polymers (Granulation Process)

7 parts by weight of n-pentane were incorporated by mixing into a polystyrene melt made of PS 148H ($M_w$=240 000 g/mol, $M_n$=87 000 g/mol, determined by means of GPC, RI detector, PS as standard) from BASF SE with intrinsic viscosity IV 83 ml/g. After cooling of the melt comprising blowing agent from initially 260° C. to a temperature of 190° C., a polystyrene melt which comprised the flame retardants mentioned in the table and optionally sulfur was incorporated by mixing into the main stream by way of an ancillary extruder.

The stated amounts in parts by weight are based on 100 parts by weight of polystyrene.

The mixture of polystyrene melt, blowing agent, and flame retardant was conveyed at 60 kg/h through a die plate having 32 holes (diameter of dies 0.75 mm). A pressurized underwater pelletization process was used to produce compact pellets with narrow size distribution.

The molar mass of the pellets was 220 000 g/mol ($M_w$) and, respectively, 80 000 g/mol ($M_n$), determined by means of GPC, RI detector, PS as standard.

The pellets were prefoamed via passage of steam and after storage for 12 hours were fused by further steam treatment in a closed mold to give foam slabs of density 15 kg/m³.

The fire behavior of the foam sheets was determined to DIN 4102 after aging for 72 hours, the foam density being 15 kg/m³.

Table 1 Collates the Results:

TABLE 1

Fire behavior of polymer composition of the invention (inventive examples) and of comparative examples

| Ex. | Flame retardant mixture (parts by weight, based on 100 parts by weight of polymer) b1) | b2) | Fire test (B2, DIN 4102/, extinguishment time(s) |
|---|---|---|---|
| comp 1 | 4 - HBCD (comparison) | — | passed/6.4 s |
| comp 2 | 8 - FSM1 | — | passed/5.3 s |
| 1 | 2.5 - FSM1 | 1 sulfur | passed/6.7 s |
| comp 3 | 12 - FSM2 | — | passed/7.7 s |
| 2 | 3 - FSM2 | 2 sulfur | passed/4.3 s |
| comp 4 | 8 - FSM3 | — | passed/5.0 s |
| 3 | 2 - FSM3 | 1.5 sulfur | passed/8.3 s |
| comp 5 | 8 - FSM4 | — | passed/5.1 s |
| 4 | 2.5 - FSM4 | 1 sulfur | passed/6.8 s |
| comp 6 | 20 - FSM5 | — | not passed/burns |
| 5 | 2.5 - FSM5 | 2.5 sulfur | passed/9.0 s |
| comp 7 | — | — | not passed/burns |

TABLE 2

Effect on fire test result of density of polystyrene foam specimens produced from EPS. The parts described in the examples are parts by weight.

| Ex. | Flame retardant mixture (parts by weight, based on 100 parts by weight of polymer) b1) | b2) | Foam density [kg/m³] (ISO 845) | Fire test (B2, DIN 4102/, extinguishment time(s) |
|---|---|---|---|---|
| 6 | 2.5 FSM4 | 1 sulfur | 15.2 | passed/6.8 s |
| 7 | 2.5 FSM4 | 1 sulfur | 61.7 | passed/9.8 s |
| 8 | 2.5 FSM4 | 1 sulfur | 118.3 | passed/13.3 s |
| comp 8 | 2.5 FSM4 | 1 sulfur | 176.9 | not passed/burns |

TABLE 3

Compressive stress for polystyrene foam specimens produced from EPS (at 10% compression) using foam density to 15 kg/m³. The parts described in the examples are parts by weight.

| Ex. | Flame retardant mixture (parts by weight, based on 100 parts by weight of polymer) b1) | b2) | Compressive stress (kPa) (ISO 844) | Fire test (B2, DIN 4102/, extinguishment time(s) |
|---|---|---|---|---|
| comp 9 | 4 - HBCD (comparison) | — | 75.2 | passed/6.4 s |
| comp 10 | 8 - FSM1 | — | 66.3 | passed/5.3 s |
| 9 | 2.5 - FSM1 | 1 sulfur | 76.2 | passed/6.7 s |
| comp 11 | 12 - FSM2 | — | 64.7 | passed/7.7 s |
| 10 | 3 - FSM2 | 2 sulfur | 74.3 | passed/4.3 s |
| comp 12 | 8 - FSM4 | — | 64.5 | passed/5.1 s |
| 11 | 2.5 - FSM4 | 1 sulfur | 75.8 | passed/6.8 s |

TABLE 4

Fire behavior of polystyrene foam specimens produced from EPS, using foam density to 15 kg/m³.

| Ex. | Flame retardant mixture (parts by weight, based on 100 parts by weight of polymer) b1) | b2) | Graphite (parts by weight) | Chalk (parts by weight) | Fire test (B2, DIN 4102/, extinguishment time(s) |
|---|---|---|---|---|---|
| comp 13 | 4 - HBCD | — | 0 | 0 | passed/6.4 s |
| comp 14 | 4 - HBCD | — | 4 | 0 | not passed/burns |
| comp 15 | 4 - HBCD | — | 0 | 4 | not passed/burns |
| comp 16 | 8 - HBCD | — | 4 | 0 | passed/7.3 s |
| comp 17 | 8 - HBCD | — | 0 | 4 | passed/5.8 s |
| 12 | 2.5 FSM4 | 1 sulfur | 0 | 0 | passed/6.8 s |
| 13 | 2.5 FSM4 | 1 sulfur | 4 | 0 | passed/7.9 s |
| 14 | 2.5 FSM4 | 1 sulfur | 0 | 4 | passed/7.8 s |

Graphite: UF2 98 from Kropfmühl
Chalk: Hydrocarb OG from Omya

Extruded Polystyrene Foam Sheets 100 parts by weight of polystyrene 158K ($M_w$=261 000 g/mol, $M_n$=77 000 g/mol, determined by means of GPC, RI detector, PS as standard) from BASF SE with intrinsic viscosity 98 ml/g, 0.1 part of talc as nucleating agent for regulation of cell size, and the parts stated in the table of flame retardants, and also, if appropriate, sulfur are introduced continuously into an extruder having an inner screw diameter of 120 mm. A blowing agent mixture made of 3.25 parts by weight of ethanol and 3.5 parts by weight of $CO_2$ is simultaneously and continuously injected via an inlet aperture provided in the extruder. The gel, uniformly kneaded at 180° C. in the extruder, is conducted through a relaxation zone and, after a residence time of 15 minutes, extruded with output temperature 105° C. into the atmosphere through a die of width 300 mm and height 1.5 mm. The foam is conducted through a molding channel connected to the extruder, giving a foamed-sheet web with cross section 650 mm×50 mm and density 35 g/l.

The molar mass of the polystyrene was 240 000 g/mol ($M_w$) and, respectively, 70 000 g/mol ($M_n$) (determined by means of GPC, RI detector, PS as standard).

The product was cut to give sheets. The fire behavior of the specimens was tested to DIN 4102 after 30 days of aging, using thicknesses of 10 mm.

Table 5 collates the results.

TABLE 5

| Ex. | Flame retardant mixture (parts by weight, based on 100 parts by weight of polystyrene) b1) | b2) | Fire test (B2, DIN 4102/, extinguishment time(s) |
|---|---|---|---|
| comp 18 | 4 - HBCD (comparison) | — | passed/9.4 s |
| comp 19 | 8 - FSM1 | — | passed/6.4 s |
| 15 | 2.5 - FSM1 | 1 sulfur | passed/7.3 s |
| comp 20 | 8 - FSM3 | — | passed/9.8 s |
| 16 | 2 - FSM3 | 1.5 sulfur | passed/9.6 s |
| comp 21 | 8 - FSM4 | — | passed/9.1 s |
| 17 | 2.5 - FSM4 | 1 sulfur | passed/10.1 s |
| comp 22 | — | — | not passed/burns |

The experiments provide evidence that the flame retardant mixture of the invention can be used to produce low-density foams based on styrene polymers which exhibit identical or improved fire behavior for reduced flame retardant loading.

The invention claimed is:

1. A polymer foam with density in the range from 5 to 120 kg/m³, comprising
   a) a polymer component, comprising at least one styrene polymer,
   b) from 0.1 to 5 parts by weight (based on 100 parts by weight of component a)) of a flame retardant mixture, comprising
   b1) at least one phosphorus compound of the formula (I) having phosphorus content in the range from 5 to 80% by weight, based on the phosphorus compound, $$(X^1)_s=PR^1R^2R^3 \qquad (I)$$

wherein
$R^1$ is $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, or $CONR^{12}R^{13}$;
$R^2$ is $C_6$-$C_{10}$-aryl;
$R^3$ is H, SH, $SR^4$, $OR^5$, or a
$-(Y^1)_n-[P(=X^2)_uR^6-(Y^2)_n]_m-P(=X^3)_tR^7R^8$ group;
$X^1$, $X^2$ and $X^3$ are identical or different and, independently of one another, O or S;
$Y^1$ and $Y^2$ are identical or different, being O or S;
$R^4$, $R^5$, $R^9$, $R^{10}$, $R^{11}$, $R^{12}$, and $R^{13}$ are identical or different, being $C_1$-$C_{12}$-alkyl, $C_3$-$C_8$-cycloalkyl, which is optionally substituted with one or more $C_1$-$C_4$-alkyl groups as substituents, or being $C_2$-$C_{12}$-alkenyl, $C_2$-$C_{12}$-alkynyl, $C_6$-$C_{10}$-aryl, or $C_6$-$C_{10}$-aryl-$C_1$-$C_4$-alkyl;
$R^6$, $R^7$, and $R^8$ are identical or different and, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, or $CONR^{12}R^{13}$;
n is 0 or 1 if $Y^1$ and, respectively, $Y^2$ is O, and is 1, 2, 3, 4, 5, 6, 7, or 8 if $Y^1$ and, respectively, $Y^2$ is S;
m is an integer from 0 to 100;
s, t, and u are, independently of one another, 0 or 1;
and
b2) elemental sulfur.

2. The polymer foam according to claim 1, wherein
n is 1 if $Y^1$ and, respectively, $Y^2$ is O, and is 1 or 2 if $Y^2$ is S;
m is an integer from 0 to 10, and
s, t, and u are 1.

3. The polymer foam according to claim 1, wherein
$R^1$ is $C_1$-$C_8$-alkyl, $C_1$-$C_8$-alkoxy, cyclohexyl, phenyl, phenoxy, benzyl, or benzyloxy;
$R^2$ is phenyl;
$R^3$ is H, SH, $SR^4$, $OR^5$ or a
—$(Y^1)_n$—$P(=X^3)_tR^7R^8$ group;
$X^1$ and $X^3$ are identical or different, being O or S;
$Y^1$ is O or S;
$R^4$ and $R^5$ are identical or different, being $C_1$-$C_8$-alkyl, cyclohexyl, phenyl, or benzyl;
$R^7$ and $R^8$ are identical or different, being $C_1$-$C_8$-alkyl, $C_1$-$C_8$-alkoxy, cyclohexyl, phenyl, phenoxy, benzyl, or benzyloxy;
n is 1 if $Y^1$ is O, and is 1 or 2 if $Y^1$ is S, and
s and t are 1.

4. The polymer foam according to claim 1, wherein
$R^1$ is phenyl or phenoxy;
$R^2$ is phenyl;
$R^3$ is H, SH, $SR^4$, $OR^5$, or a
—$(Y^1)_n$—$P(=X^3)_tR^7R^8$ group;
$X^1$ and $X^3$ are identical or different, being O or S;
$Y^1$ is O or S;
$R^4$ and $R^5$ are identical or different, being cyclohexyl, phenyl, or benzyl;
$R^7$ and $R^8$ are identical or different, being phenyl, or phenoxy;
n is 1 if $Y^1$ is O, and is 1 or 2 if $Y^1$ is S, and
s and t are 1.

5. The polymer foam according to claim 1, wherein the compound (I) is selected from the groups (Ia)-(Iy):

$$S=PR^1R^2—H \quad (Ia)$$

$$S=PR^1R^2—SH \quad (Ib)$$

$$S=PR^1R^2—OH \quad (Ic)$$

$$S=PR^1R^2—S\text{-phenyl} \quad (Id)$$

$$S=PR^1R^2—O\text{-phenyl} \quad (Ie)$$

$$S=PR^1R^2—S\text{-benzyl} \quad (If)$$

$$S=PR^1R^2—O\text{-benzyl} \quad (Ig)$$

$$S=PR^1R^2—P(=S)R^7R^8 \quad (Ih)$$

$$S=PR^1R^2—S—P(=S)R^7R^8 \quad (Ii)$$

$$S=PR^1R^2—S—S—P(=S)R^7R^8 \quad (Ij)$$

$$S=PR^1R^2—O—P(=S)R^7R^8 \quad (Ik)$$

$$O=PR^1R^2—H \quad (Il)$$

$$O=PR^1R^2—SH \quad (Im)$$

$$O=PR^1R^2—OH \quad (In)$$

$$O=PR^1R^2—S\text{-phenyl} \quad (Io)$$

$$O=PR^1R^2—O\text{-phenyl} \quad (Ip)$$

$$O=PR^1R^2—S\text{-benzyl} \quad (Iq)$$

$$O=PR^1R^2—P(=S)R^7R^8 \quad (Ir)$$

$$O=PR^1R^2—S—P(=S)R^7R^8 \quad (Is)$$

$$O=PR^1R^2—S—S—P(=S)R^7R^8 \quad (It)$$

$$O=PR^1R^2—O—P(=S)R^7R^8 \quad (Iu)$$

$$O=PR^1R^2—P(=O)R^7R^8 \quad (Iv)$$

$$O=PR^1R^2—S—P(=O)R^7R^8 \quad (Iw)$$

$$O=PR^1R^2—S—S—P(=O)R^7R^8 \quad (Ix)$$

$$O=PR^1R^2—O—P(=O)R^7R^8 \quad (Iy),$$

where the definitions of the symbols are as stated in the formula (I).

6. The polymer foam according to claim 1, where the compound of the formula (I) is selected from:

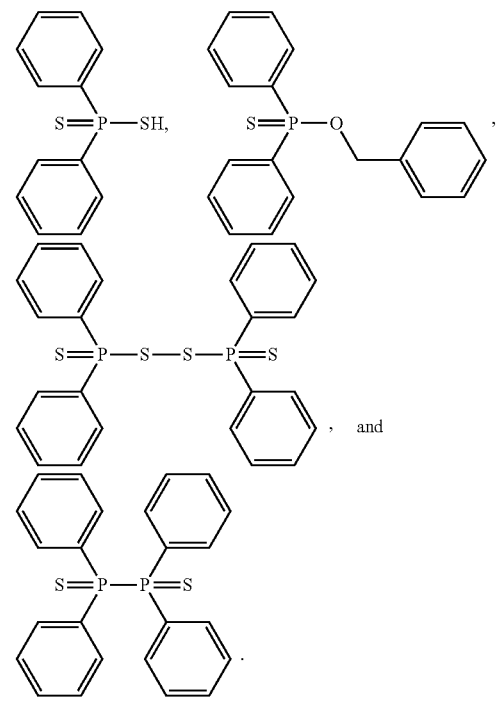

7. The polymer foam according to claim 1, comprising one compound of the formula (I).

8. The polymer foam according to claim 1, comprising two or more compounds of the formula (I).

9. The polymer foam according to claim 1, where the ratio of components b1): b2) is from 1:0.1 to 10.

10. The polymer foam according to claim 1, comprising from 2.5 to 4.0 parts by weight of component b) (based on 100 parts by weight of component a)).

11. The polymer foam according to claim 1, where component (a) is used in a mixture with one or more further flame retardants and/or with one or more further synergists.

12. The polymer foam according to claim 1, obtainable via foaming of an expandable pelletized styrene polymer material.

13. A process for producing an expanded styrene polymer foam (EPS) comprising the following steps
a) mixing to incorporate an organic blowing agent and the flame retardant mixture according to claim 1 into a styrene polymer melt by means of static or dynamic mixers at a temperature of at least 150° C., b) cooling of the blowing agent—containing styrene polymer melt to a temperature of at least 120° C., c) discharge through a die plate with holes, the diameter of which at the exit from the die is at most 1.5 mm, d) pelletizing the melt comprising blowing agent directly behind the die plate under water at a pressure in the range from 1 to 20 bar, and e) foaming the obtained granulates to an EPS foam having a density of from 5 to 120 kg/m³.

14. A process for the production of an expanded styrene polymer foam comprising the steps of a) polymerizing one or more styrene monomers in suspension;

b) adding the flame retardant mixture according to claim 1 and optionally further additives and/or auxiliaries before, during and/or after polymerization, c) adding an organic blowing agent before, during and/or after polymerization, and, d) separating the expandable styrene polymer particles, comprising the flame retardant mixture according to claim 1, e) foaming the obtained granulates to an EPS foam having a density of from 5 to 120 kg/m³.

15. The polymer foam according to claim 1, in the form of an extruded styrene polymer foam (XPS).

16. A process for producing the extruded foam of a styrene polymer (XPS) according to claim 15, comprising the steps of:

(a) heating of a polymer component P comprising at least one styrene polymer, to form a polymer melt, (b) introducing a blowing agent component T into the polymer melt to form a foamable melt, (c) extruding the foamable melt into a region of relatively low pressure with foaming to give an extruded foam having a density of from 5 to 120 kg/m³, and (d) adding a flame retardant mixture comprising b1) at least one phosphorus compound of the formula (I) having phosphorus content in the range from 5 to 80% by weight, based on the phosphorus compound,

wherein $R^1$ is $C_1$-$C_{16}$-alkyl, $C_1$-$C_{10}$-hydroxyalkyl, $C_2$-$C_{16}$-alkenyl, alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, or $CONR^{12}R^{13}$;

$R^2$ is $C_6$-$C_{10}$-aryl;

$R^3$ is H, SH, $SR^4$, $OR^5$, or a
—$(Y^1)_n$—$[P(=X^2)_uR^6$—$(Y^2)_n]_m$—$P(=X^3)_tR^7R^8$ group;

$X^1$, $X^2$ and $X^3$ are identical or different and, independently of one another, O or S;

$Y^1$ and $Y^2$ are identical or different, being O or S;

$R^4$, $R^5$, $R^9$, $R^{10}$, $R^{11}$, $R^{12}$, and $R^{13}$ are identical or different, being $C_1$-$C_{12}$-alkyl, $C_3$-$C_8$-cycloalkyl, which is optionally substituted with one or more $C_1$-$C_4$-alkyl groups as substituents, or being $C_2$-$C_{12}$-alkenyl, $C_2$-$C_{12}$-alkynyl, $C_6$-$C_{10}$-aryl, or $C_6$-$C_{10}$-aryl-$C_1$-$C_4$-alkyl;

$R^6$, $R^7$, and $R^8$ are identical or different and, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, or $CONR^{12}R^{13}$;

n is 1 if $Y^1$ and, respectively, $Y^2$ is O, and is 1, 2, 3, 4, 5, 6, 7, or 8 if $Y^1$ and, respectively, $Y^2$ is S;

m is an integer from 0 to 100;

s, t, and u are, independently of one another, 0 or 1; and b2) elemental sulfur and optionally further auxiliaries and added materials, in at least one of steps a) and/or b).

17. An insulating material comprising the polymer foam according to claim 1.

18. A process for producing a polymer foam according to claim 1, where from 0.1 to 5.0 parts by weight (based on 100 parts by weight of (a)) of flame-retardant mixture (b) are added to polymer component (a).

19. An expandable pelletized polystyrene material, comprising a) a polymer component, comprising at least one styrene polymer b) from 0.1 to 5 parts by weight (based on 100 parts by weight of component a)) of a flame retardant mixture, comprising b1) at least one phosphorus compound of the formula (I) having phosphorus content in the range from 5 to 80% by weight, based on the phosphorus compound,

wherein $R^1$ is $C_1$-$C_{16}$-alkyl, $C_1$-$C_{10}$-hydroxyalkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, or $CONR^{12}R^{13}$;

$R^2$ is $C_6$-$C_{10}$-aryl;

$R^3$ is H, SH, $SR^4$, $OR^5$, or a
—$(Y^1)_n$—$[P(=X^2)_uR^6$—$(Y^2)_n]_m$—$P(=X^3)_tR^7R^8$ group;

$X^1$, $X^2$ and $X^3$ are identical or different and, independently of one another, O or S;

$Y^1$ and $Y^2$ are identical or different, being O or S;

$R^4$, $R^5$, $R^9$, $R^{10}$, $R^{11}$, $R^{12}$, and $R^{13}$ are identical or different, being $C_1$-$C_{12}$-alkyl, $C_3$-$C_8$-cycloalkyl, which is optionally substituted by one or more $C_1$-$C_4$-alkyl groups as substituents, or being $C_2$-$C_{12}$-alkenyl, $C_2$-$C_{12}$-alkynyl, $C_6$-$C_{10}$-aryl, or $C_6$-$C_{10}$-aryl-$C_1$-$C_4$-alkyl;

$R^6$, $R^7$, and $R^8$ are identical or different and, independently of one another, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, or $CONR^{12}R^{13}$;

n is 0 or 1 if $Y^1$ and, respectively, $Y^2$ is O, and is 1, 2, 3, 4, 5, 6, 7, or 8 if $Y^1$ and, respectively, $Y^2$ is S;

m is 0 or an integer from 1 to 100;

s, t, and u are, independently of one another, 0 or 1; and b2) elemental sulfur.

20. A polymer foam with density in the range from 5 to 120 kg/m³, comprising a) a polymer component, comprising at least one styrene polymer, b) from 0.1 to 5 parts by weight (based on 100 parts by weight of component a)) of a flame retardant mixture, comprising b1) at least one phosphorus compound of the formula (I) having phosphorus content in the range from 5 to 80% by weight, based on the phosphorus compound, $$(X^1)_s=PR^1R^2R^3 \qquad (I)$$

wherein
R$^1$ is phenyl or phenoxy;
R$^2$ is phenyl;
R$^3$ is H, SH, SR$^4$, OR$^5$, or a
—(Y$^1$)$_n$—P(=X$^3$)$_t$R$^7$R$^8$ group;
X$^1$ and X$^3$ are identical or different, being O or S;
Y$^1$ is O or S;
R$^4$ and R$^5$ are identical or different, being cyclohexyl, phenyl, or benzyl;
R$^7$ and R$^8$ are identical or different, being phenyl, or phenoxy;
n is 0 or 1 if Y$^1$ is O, and is 1 or 2 if Y$^1$ is S, and
s and t are 1.

\* \* \* \* \*